(12) United States Patent
Serra et al.

(10) Patent No.: US 11,047,440 B2
(45) Date of Patent: Jun. 29, 2021

(54) HOT RUNNER DETECTION AND RESPONSE SYSTEMS, DEVICES, AND METHODS

(71) Applicant: ITT ITALIA S.r.l., Barge (IT)

(72) Inventors: Stefano Serra, San Pietro Val Lemina (IT); Daniele Donzelli, Luserna San Giovanni (IT); Mattia Solari, Barge (IT); Marco Terranova, Turin (IT)

(73) Assignee: ITT Italia S.r.l., Barge (IT)

( * ) Notice: Subject to any disclaimer, the term of this patent is extended or adjusted under 35 U.S.C. 154(b) by 0 days.

(21) Appl. No.: 16/416,661

(22) Filed: May 20, 2019

(65) Prior Publication Data

US 2019/0338818 A1    Nov. 7, 2019

Related U.S. Application Data

(63) Continuation of application No. 15/268,179, filed on Sep. 16, 2016, now Pat. No. 10,295,006.

(30) Foreign Application Priority Data

Sep. 17, 2015    (IT) .......................... 102015000052631

(51) Int. Cl.
*F16D 66/00*    (2006.01)
*F16D 65/092*   (2006.01)
(Continued)

(52) U.S. Cl.
CPC ............ *F16D 66/00* (2013.01); *F16D 55/226* (2013.01); *F16D 65/0006* (2013.01); *F16D 65/092* (2013.01); *F16D 65/183* (2013.01); *F16D 66/021* (2013.01); *G01L 5/28* (2013.01); *F16D 55/225* (2013.01); *F16D 2066/001* (2013.01);
(Continued)

(58) Field of Classification Search
CPC ............... F16D 2066/005; F16D 66/00; F16D 2066/001; F16D 65/092; F16D 2066/006; F16D 55/225; F16D 66/021; F16D 55/226; F16D 65/183; G01L 1/16; B60T 17/22
See application file for complete search history.

(56) References Cited

U.S. PATENT DOCUMENTS 2,117,027 A * 5/1938 Langbein ................ B60T 17/22
                                                   374/113
2,289,954 A    7/1942 Arndt, Jr.
(Continued)

FOREIGN PATENT DOCUMENTS

CN    104813060 A    2/2018
DE    100 06 012 A1    9/2000
(Continued)

OTHER PUBLICATIONS

U.S. Appl. No. 15/947,008, filed Apr. 6, 2018, Donzelli et al.
(Continued)

*Primary Examiner* — Bradley T King
*Assistant Examiner* — Mahbubur Rashid
(74) *Attorney, Agent, or Firm* — Knobbe, Martens, Olson & Bear, LLP

(57) ABSTRACT

Various systems, devices, and methods for detecting and/or responding to the temperature of brakes are disclosed. Certain embodiments relate to inhibiting or preventing the overheating of the brakes of such vehicles, such as could occur when a hot runner condition is present.

21 Claims, 8 Drawing Sheets

(51) Int. Cl.
*G01L 5/28* (2006.01)
*F16D 55/226* (2006.01)
*F16D 65/00* (2006.01)
*F16D 65/18* (2006.01)
*F16D 66/02* (2006.01)
*F16D 55/225* (2006.01)

(52) U.S. Cl.
CPC .. *F16D 2066/005* (2013.01); *F16D 2066/006* (2013.01)

(56) References Cited

U.S. PATENT DOCUMENTS

| | | | |
|---|---|---|---|
| 3,689,880 A | 9/1972 | McKee et al. | |
| 3,724,916 A | 4/1973 | Hirzel | |
| 3,902,157 A | 8/1975 | Kita et al. | |
| 4,023,864 A | 5/1977 | Lang et al. | |
| 4,117,451 A | 9/1978 | Sato et al. | |
| 4,298,857 A | 11/1981 | Robins et al. | |
| 4,456,098 A | 6/1984 | Lindre | |
| 4,484,280 A | 11/1984 | Brugger et al. | |
| 4,495,434 A * | 1/1985 | Diepers | G01L 1/146 310/338 |
| 4,623,044 A | 11/1986 | Ohta et al. | |
| 4,649,370 A | 3/1987 | Thomason | |
| 4,782,319 A | 11/1988 | Dell'Acqua et al. | |
| 4,854,424 A | 8/1989 | Yamatoh et al. | |
| 4,869,350 A | 9/1989 | Fargier et al. | |
| 4,901,055 A | 2/1990 | Rosenberg et al. | |
| 4,928,030 A | 5/1990 | Culp | |
| 5,090,518 A * | 2/1992 | Schenk | B60T 8/00 188/157 |
| 5,099,962 A | 3/1992 | Furusu et al. | |
| 5,115,162 A | 5/1992 | Leonard et al. | |
| 5,133,431 A | 7/1992 | Braun | |
| 5,176,034 A | 1/1993 | Hazony et al. | |
| 5,235,135 A | 8/1993 | Knecht et al. | |
| 5,302,940 A | 4/1994 | Chen | |
| 5,406,682 A | 4/1995 | Zimnicki et al. | |
| 5,416,415 A | 5/1995 | Dorri et al. | |
| 5,419,415 A | 5/1995 | Lamb et al. | |
| 5,660,215 A | 8/1997 | Nishikawa et al. | |
| 5,719,577 A | 2/1998 | Pitot et al. | |
| 5,839,545 A | 11/1998 | Preston et al. | |
| 6,064,970 A | 5/2000 | McMillan et al. | |
| 6,179,091 B1 | 1/2001 | Takanashi | |
| 6,204,786 B1 | 3/2001 | Bieth et al. | |
| 6,310,545 B1 * | 10/2001 | Sapir | B60T 17/221 188/1.11 R |
| 6,339,956 B1 | 1/2002 | Huinink et al. | |
| 6,345,225 B1 | 2/2002 | Bohm et al. | |
| 6,477,893 B1 | 11/2002 | Djordjevic | |
| 6,529,803 B2 | 3/2003 | Meyers et al. | |
| 6,549,126 B2 | 4/2003 | Hageman et al. | |
| 6,612,736 B2 * | 9/2003 | Lee | G01K 1/14 188/1.11 E |
| 6,668,983 B2 | 12/2003 | Drennen et al. | |
| 6,681,631 B2 | 1/2004 | Apel | |
| 6,813,581 B1 * | 11/2004 | Snyder | G01K 7/42 246/169 A |
| 6,823,242 B1 * | 11/2004 | Ralph | B60T 17/228 340/682 |
| 6,934,618 B2 * | 8/2005 | Eckert | B60T 8/00 303/128 |
| 7,124,639 B1 | 10/2006 | Kurtz et al. | |
| 7,127,948 B2 | 10/2006 | Tavares et al. | |
| 7,451,653 B1 | 11/2008 | Sippola | |
| 7,694,555 B2 | 4/2010 | Howell et al. | |
| 8,026,802 B2 * | 9/2011 | Shimura | B60C 23/0408 340/442 |
| 8,287,055 B2 | 10/2012 | Lee | |
| 8,573,045 B2 | 11/2013 | Gotschlich | |
| 8,676,721 B2 | 3/2014 | Piovesan et al. | |
| 8,717,158 B2 * | 5/2014 | Roach | B60T 17/22 188/62 |
| 8,739,938 B2 * | 6/2014 | King | F16D 66/027 188/1.11 E |
| 8,789,896 B2 | 7/2014 | Albright et al. | |
| 8,958,966 B2 * | 2/2015 | Nohira | B60T 8/885 701/70 |
| 9,187,099 B2 | 11/2015 | Powers et al. | |
| 9,269,202 B2 | 2/2016 | Phelan et al. | |
| 9,286,736 B2 | 3/2016 | Punjabi et al. | |
| 9,316,278 B2 | 4/2016 | Moore et al. | |
| 9,415,757 B2 | 8/2016 | Martinotto et al. | |
| 9,635,467 B2 | 4/2017 | Miyoshi et al. | |
| 9,939,035 B2 | 4/2018 | Donzelli et al. | |
| 9,964,167 B2 | 5/2018 | Martinotto et al. | |
| 9,988,024 B2 * | 6/2018 | Schwartz | B60T 8/172 |
| 10,138,968 B2 | 11/2018 | Serra et al. | |
| 10,208,822 B2 | 2/2019 | Donzelli et al. | |
| 10,227,064 B2 | 3/2019 | Serra et al. | |
| 2001/0042661 A1 | 11/2001 | Treyde | |
| 2002/0047496 A1 | 4/2002 | Wierach | |
| 2002/0095253 A1 | 7/2002 | Losey et al. | |
| 2002/0104717 A1 * | 8/2002 | Borugian | B60T 17/221 188/1.11 E |
| 2004/0015283 A1 | 1/2004 | Eckert et al. | |
| 2004/0041464 A1 * | 3/2004 | Eckert | B60T 8/1708 303/7 |
| 2004/0187591 A1 | 9/2004 | Baumann et al. | |
| 2004/0242803 A1 | 12/2004 | Ohme et al. | |
| 2005/0029056 A1 | 2/2005 | Baumgartner et al. | |
| 2005/0103580 A1 | 5/2005 | Kramer | |
| 2006/0076196 A1 | 4/2006 | Palladino | |
| 2006/0254868 A1 | 11/2006 | Thiesing et al. | |
| 2007/0024113 A1 | 2/2007 | Thrush | |
| 2007/0228824 A1 | 10/2007 | Yasukawa et al. | |
| 2007/0235268 A1 * | 10/2007 | Caron | B60T 17/221 188/71.8 |
| 2007/0284713 A1 | 12/2007 | Ninomiya et al. | |
| 2009/0033146 A1 | 2/2009 | Rieth et al. | |
| 2009/0133971 A1 | 5/2009 | Baier-Welt | |
| 2009/0157358 A1 | 6/2009 | Kim | |
| 2009/0187324 A1 | 7/2009 | Lu et al. | |
| 2009/0218179 A1 * | 9/2009 | Yokoyama | F16D 65/18 188/1.11 L |
| 2010/0186938 A1 | 7/2010 | Murata et al. | |
| 2010/0211249 A1 | 8/2010 | McClellan | |
| 2010/0250081 A1 | 9/2010 | Kinser et al. | |
| 2011/0050406 A1 | 3/2011 | Hennig et al. | |
| 2011/0125381 A1 | 5/2011 | Szell et al. | |
| 2013/0048443 A1 | 2/2013 | Muramatsu et al. | |
| 2013/0192933 A1 | 8/2013 | King et al. | |
| 2014/0097951 A1 | 4/2014 | Grgic | |
| 2014/0200784 A1 * | 7/2014 | Nohira | B60T 8/885 701/70 |
| 2014/0257605 A1 | 9/2014 | Beck et al. | |
| 2014/0311833 A1 | 10/2014 | Martinotto et al. | |
| 2014/0337086 A1 | 11/2014 | Asenjo et al. | |
| 2015/0112515 A1 * | 4/2015 | Conway | F16D 66/00 701/3 |
| 2016/0014526 A1 | 1/2016 | Miyoshi et al. | |
| 2016/0146279 A1 | 5/2016 | Philpott | |
| 2016/0341622 A1 | 11/2016 | Mensa | |
| 2017/0002883 A1 | 1/2017 | Donzelli et al. | |
| 2017/0030424 A1 | 2/2017 | Martinotto et al. | |
| 2017/0052028 A1 | 2/2017 | Choudhury et al. | |
| 2017/0082163 A1 | 3/2017 | Serra et al. | |
| 2017/0082164 A1 | 3/2017 | Serra et al. | |
| 2017/0082165 A1 | 3/2017 | Donzelli et al. | |
| 2017/0082166 A1 | 3/2017 | Serra et al. | |
| 2017/0082167 A1 | 3/2017 | Serra et al. | |
| 2017/0331030 A1 | 11/2017 | Inoue et al. | |
| 2018/0160248 A1 | 6/2018 | Murakami et al. | |
| 2018/0231084 A1 | 8/2018 | Donzelli et al. | |
| 2018/0244159 A1 * | 8/2018 | Satterthwaite | B60T 8/17552 |

(56) References Cited

U.S. PATENT DOCUMENTS

| | | |
|---|---|---|
| 2018/0306262 A1 | 10/2018 | Martinotto et al. |
| 2019/0003541 A1 | 1/2019 | Serra et al. |

FOREIGN PATENT DOCUMENTS

| | | |
|---|---|---|
| DE | 10230008 | 1/2004 |
| DE | 10243127 A1 | 3/2004 |
| DE | 10259629 A1 | 7/2004 |
| DE | 10 2005 052630 A1 | 3/2007 |
| DE | 10 2006 018 952 | 10/2007 |
| DE | 10 2006 053 489 | 5/2008 |
| DE | 10 2010 010482 A1 | 8/2011 |
| EP | 0 189 076 A2 | 7/1986 |
| EP | 0 601 681 A1 | 6/1995 |
| EP | 0 744 558 A1 | 11/1996 |
| EP | 1431606 A1 | 6/2004 |
| EP | 1530037 A1 | 5/2005 |
| EP | 1531110 | 5/2005 |
| EP | 1923592 B1 | 5/2008 |
| EP | 2741063 A1 | 6/2014 |
| EP | 2 778 462 A1 | 9/2014 |
| EP | 2570691 A1 | 10/2014 |
| FR | 2 815 040 A1 | 4/2002 |
| GB | 2309057 | 7/1997 |
| GB | 2372825 A | 9/2002 |
| GB | 2478423 | 9/2011 |
| JP | S58-206458 A | 12/1983 |
| JP | H11 94707 A | 4/1999 |
| JP | H11-125285 A | 5/1999 |
| JP | 2002-130348 A | 5/2002 |
| JP | 2006-193091 | 7/2006 |
| JP | 2007-224988 | 9/2007 |
| JP | 2011-116237 A | 6/2011 |
| KR | 10-2004-48957 | 2/2000 |
| KR | 2009 0057640 A | 6/2009 |
| KR | 2011 0043849 A | 4/2011 |
| WO | WO 1999/08018 A1 | 2/1999 |
| WO | WO 2004/027433 A1 | 4/2004 |
| WO | WO 2014/170726 | 10/2014 |
| WO | WO 2014/170849 | 10/2014 |
| WO | WO 2015/013217 A1 | 1/2015 |
| WO | WO 2016/038533 A1 | 3/2016 |

OTHER PUBLICATIONS

U.S. Appl. No. 16/020,680, filed Jun. 27, 2018, Donzelli et al.
U.S. Appl. No. 16/250,856, filed Jan. 17, 2019, Serra et al.
Italian Search Report and Written Opinion for Italian Patent Application No. IT UB201510291; dated May 28, 2015; 7 pages.
Italian Search Report Coversheet for Italian Patent Application No. 102015000018714/ITUB20151184; dated Jan. 26, 2016; 1 page.
Italian Search Report Coversheet for Italian Patent Application No. 102015000018748/ITUB20151291; dated Feb. 3, 2016; 1 page.
Italian Search Report Coversheet Italian Patent Application No. 102015000018701 ITUB20151029; dated Feb. 3, 2016; 1 page.
Italian Search Report for Italian Patent Application No. IO 56568 IT UB20151059; dated Jan. 20, 2016; 7 pages.
Italian Search Report for Italian Patent Application No. IO 56584/ITUB20151184; dated Jan. 14, 2016; 7 pages.
Italian Search Report Italian Patent Application No. IO 56565/ITUB20151029; dated Jan. 22, 2016; 8 pages.
U.S. Appl. No. 15/167,883, filed May 27, 2016, Donzelli et al.
U.S. Appl. No. 15/184,806, filed Jun. 16, 2016, Martinotto et al.
U.S. Appl. No. 15/268,039, filed Sep. 16, 2016, Serra et al.
U.S. Appl. No. 15/268,179, filed Sep. 16, 2016, Serra et al.
European Search Report; European Application No. EP 14158449; dated Aug. 6, 2014.
International Search Report; International Application No. PCT/IB2015/056861; dated Jan. 18, 2016.
International Search Report; International Application No. PCT/IB2014/060778; dated Aug. 6, 2014.
International Search Report; International Application No. PCT/IB2013/060881; dated Jul. 3, 2014.
Italian Search Report and Written Opinion for Italian Patent Application No. IT UB20151291; dated May 28, 2015; 7 pages.
Italian Search Report and Written Opinion for Italian Patent Application No. IT UB20151184; dated May 28, 2015; 7 pages.
Italian Search Report and Written Opinion for Italian Patent Application No. IT UB20151059; dated May 28, 2015; 7 pages.
Italian Search Report and Written Opinion for Italian Patent Application No. IT UB20151029; dated May 28, 2015; 8 pages.
Von Wagner, et al.; Active Control of Brake Squeal Via "Smart Pads"; Oct. 10, 2004.
"The Next Generation of Hub Units"; SKF Group; 2012, www.vsm.skf.com; 32 pages.
Solyom, Stefan, et al.; "Synthesis of a Model-Based Tire Slip Controller"; 2004; Vehicle System Dynamics, pp. 475-499; http://dx.doi.org/10.1080/004231105123313868.
Gustafsson, Fredrik; "Slip-based Tire-Road Friction Estimation"; Automatica, 1997; vol. 33, No. 6; pp. 1087-1099.
Pasillas-Lepine, William; "Hybrid Modeling and Limit Cycle Analysis for a Class of Five-Phase Anti-Lock Brake Algorithms"; Feb. 1, 2006; vol. 44, No. 2; pp. 173-188.
Capra, D. et al.; An ABS Control Logic Based on Wheel Force Measurement. In: Vehicle System Dynamics; vol. 50, No. 12, pp. 1779-1796; http://porto.polito.it/2497487/.
Ait-Hammouda, Islam; "Jumps and Synchronization in Anti-Lock Brake Algorithms"; Oct. 2008, Japan, 7 pages; https://hal.archives-ouvertes.fr/hal-00525788.
Yi, Jingang; Emergency Braking Control with an Observer-based Dynamic Tire/Rotation Friction Model and Wheel Angular Velocity Measurement; Vehicle System Dynamics; 2003, vol. 39, No. 2; peg. 81-97.
Ray, Laura; "Nonlinear Tire Force Estimation and Road Friction Identification: Simulation and Experiments"; Automatica, vol. 33, No. 10, pp. 1819-1833; 1997.
Italian Search Report, IO 58761 (IT UB20153706), dated May 25, 2016, 8 pages.
Italian Search Report, IO 58837 (IT UB20153709), dated May 31, 2016, 7 pages.
International Search Report and Written Opinion; International Application No. PCT/EP2017/054455, filed on Feb. 27, 2017; dated May 3, 2017.
Chinese Office Action in Chinese Application No. 201680054121.1 dated Mar. 26, 2019 in 9 pages.
Chinese Office Action in Chinese Application No. 201680054121. dated Feb. 3, 2020 in 8 pages.
Chinese Office Action in Chinese Application No. 201680054121.1 dated Nov. 4, 2020 in 8 pages.
Chinese Office Action in Chinese Application No. 201680054121.1 dated Jan. 19, 2021 in 28 pages.
European Office Action in European Application No. 16770243.0 dated Oct. 15, 2019 in 5 pages.
European Office Action in European Application No. 16770243.0 dated Jan. 12, 2020 in 3 pages.
European Office Action in European Application No. 16770243.0 dated Jun. 23, 2020 in 5 pages.
Indian Office Action Indian Application No. 201837009364 dated Nov. 20, 2020 in 15 pages.
International Search Report in PCT Application No. PCT/EP2016/071865 dated Dec. 13, 2016 in 3 pages.
Japanese Office Action in Japanese Application No. 2018513655 dated Jul. 14, 2020 in 6 pages.
Japanese Search Report in Japanese Application No. 2018513655 (0022000625) dated May 25, 2020 in 12 pages.
Official European Communication in European Application No. 16770243.0 dated Oct. 19, 2020 in 11 pages.
Written Opinion in PCT Application No. PCT/EP2016/071865 dated Dec. 13, 2020 in 6 pages.
Written Opinion in Japanese Application No. 2018513655 dated Oct. 12, 2020 in 4 pages.

(56) References Cited

OTHER PUBLICATIONS

Written Amendment in Japanese Application No. 2018513655 dated Oct. 12, 2020 in 5 pages.

\* cited by examiner

HOT RUNNER DETECTION AND RESPONSE SYSTEMS, DEVICES, AND METHODS

INCORPORATION BY REFERENCE OF ANY PRIORITY APPLICATIONS

This application is a continuation application of U.S. patent application Ser. No. 15/268,179, filed on Sep. 16, 2016, which claims priority to Italian Patent Application No. 102015000052631, filed on Sep. 17, 2015, the disclosures of which are incorporated herein by reference. All applications for which a foreign or domestic priority claim is identified in the Application Data Sheet as filed with the present application are hereby incorporated by reference under 37 CFR 1.57.

BACKGROUND

Field

The present disclosure relates to systems, devices, and methods for detecting and/or responding to the temperature of brakes, such as braking devices for heavy vehicles. Certain embodiments relate to inhibiting or preventing the overheating of the brakes of such vehicles.

Description of Certain Related Art

A braking unit is a mechanical apparatus that diverts energy from a moving system, thereby reducing the motion of the moving system. A braking unit is typically used for slowing or stopping a moving vehicle, such as by friction between a generally non-rotating brake pad and a rotating brake disk or drum. The brake pad can be pressed against the brake disk or drum by a brake caliper.

SUMMARY OF CERTAIN EMBODIMENTS

A problem associated with braking units occurs when the brake pad is in unintentional contact with the brake disk or drum. For example, a malfunction may cause the brake caliper to lock-up against the disk or drum, resulting in an unwanted continuous braking condition. The constant friction between the disk and the brake pad can result in excessive heating, which can cause serious damage to the braking unit and/or other components (e.g., can cause bursting of the tire on the wheel with the malfunctioning brake). This problem is called a "hot runner." The problem of hot runners can be particularly significant within the context of heavy vehicles, such as articulated vehicles, due to the heavy loads, high energies, and conditions in which such vehicles are often operated. This problem can be further exacerbated under conditions that are demanding for the braking unit, such as when descending a prolonged downward grade.

Various embodiments disclosed herein relate to hot runner detection and response systems, devices, and methods, such as systems and for inhibiting or preventing the overheating of the brakes of vehicles, such as heavy vehicles. Certain embodiments disclosed herein provide a braking unit for heavy vehicles. Some embodiments provide a method for inhibiting or preventing the overheating of the brakes on a heavy vehicle when traveling. Some variants provide a simple and reliable system for reducing or preventing the hot runners phenomenon. Certain implementations improve heavy vehicle road safety. Various embodiments provide a safety system that is capable of detecting and/or predicting the initial phases of the hot runners phenomenon. Some embodiments include providing a timely warning (e.g., to the driver, to another user, or to another computing system) to reduce the danger associated with hot runners.

Some vehicle braking units include a braking device, such as a brake pad comprising one or a plurality of sensors. For example, the brake pad can include at least one piezoceramic sensor that is configured to operate at high temperatures and/or to emit an electrical signal when subjected to mechanical stress. The brake pad thus structured is able to detect in a simple and economical way, without the need for an external energy source, the presence and extent of the mechanical stresses which can arise at the interface between the pad and the brake disk. Such a brake pad can allow for the possibility of monitoring the braking, such as to reduce or eliminate phenomena (e.g., vibrations and noise) and/or to report abnormal operating conditions.

Certain embodiments disclosed herein relate a braking unit for heavy vehicles. The braking unit can include braking devices. Each braking device can include at least one brake shoe or brake pad associated with a wheel of the heavy vehicle. The pad or shoe can have a support and a block of friction material configured to act upon a brake disk or brake drum. The brake pad can include at least one temperature sensor located between the block of friction material and the support. The temperature of the brake pad is typically representative of the brake operating temperature. Moreover, obtaining the temperature datum from a non-rotating part of the brake system (e.g., the brake pad) avoids other limitations that are typical of measurements taken on rotating bodies, such as disk brakes or drum brakes, that render measurement complex and costly.

The brake pad can include a safety device for inhibiting or preventing the overheating of the brakes. The safety device can have one or more alarm units and one or more control units. The control units can communicate with the at least one sensor and/or with the alarm unit. The control units can have a memory comprising a first temperature threshold. In some embodiments, if the temperature detected for at least one brake pad or brake shoe is higher than the first temperature threshold, then an alarm signal is emitted. The control units can include a comparator that is configured to validate the emission of the alarm of a condition is met. For example, the condition can be that the temperature detected for at least one brake pad or brake shoe is higher than the first temperature threshold and the temperature detected for at least one other brake pad or brake shoe is lower than the first temperature threshold.

In some embodiments, the comparator is configured for substantially real-time comparison of the temperatures detected at the brake pads or brake shoes. In some embodiments, the comparator is configured to validate the emission of the alarm if the temperature detected for at least one brake pad is higher than the first temperature threshold and if the temperature detected for the certain number or amount (e.g., a majority) of the brake pads is lower than the first temperature threshold.

In some embodiments, the memory comprises a second temperature threshold that is lower than the first temperature threshold, the control units being configured to drive the emission of a pre-alarm if the temperature detected for at least one brake pad or brake shoe falls between the first and the second temperature thresholds. In some implementations, the alarm unit is configured for the emission of an acoustic and/or audible alarm.

In some embodiments, the control units comprise peripheral electronic control units each located at a respective brake and a central electronic control unit communicating with the peripheral control units and with the alarm unit. In some embodiments, the control units comprise a central electronic control unit communicating with the at least one sensor and with the alarm unit. In some embodiments, the control units are connected to a CAN-bus (Controller Area Network) of the vehicle.

In some embodiments, the brake pad comprises at least one ancillary sensor located between the block of friction material and the support and communicates with the control units, the at least one ancillary sensor comprising at least one pressure sensor and/or one shear sensor. In some embodiments, the pressure sensor and the shear sensor are piezoceramic sensors which differ in regard to the direction of the applied bias therein.

In some embodiments, the comparator is configured to validate the emission of the alarm only in the presence of a predetermined correlation between the temperature signal and the signal produced by the at least one ancillary sensor within a predetermined measurement interval of time.

In some embodiments, each sensor is covered by an electrically insulating protective layer. In certain embodiments, the control units comprise an electrical power supply that is configured to absorb energy from the motion of the vehicle.

Some embodiments of the invention comprise a method for inhibiting or preventing the overheating of the brakes on a heavy vehicle. Each brake can comprise at least one brake pad or a brake shoe having a support and a block of friction material acting upon a brake disk or brake drum associated with a wheel of the heavy vehicle, at least one temperature sensor located between the block of friction material and the support. The method can include acquiring (e.g., in real time or after a time delay) the temperature detected at the brake pads or brake shoe. The method can include comparing (e.g., in real time or after a time delay) the temperature detected at the brake pads or brake shoes. The method can include validating the emission of an alarm. For example, the validation can occur in response to the temperature detected for at least one brake pad or brake shoe being higher than the temperature threshold and the temperature detected for at least one brake pad or brake shoe is lower than the temperature threshold. The method can include, in response to the validation occurring, generating an acoustic and/or visual alarm.

BRIEF DESCRIPTION OF THE DRAWINGS

Additional features and benefits of the invention will become further evident from the description below, which relates to certain non-exclusive embodiments of braking systems, devices, and methods for inhibiting or preventing the overheating of the brakes on a heavy vehicle. These and other features are illustrated by way of certain non-limiting examples in the accompanying drawings, in which.

DETAILED DESCRIPTION OF CERTAIN EMBODIMENTS

Embodiments of systems, components, and methods will now be described with reference to the accompanying figures, wherein like numerals refer to like or similar elements throughout. Although several embodiments, examples and illustrations are disclosed below, the inventions described herein extends beyond the specifically disclosed embodiments, examples, and illustrations. The inventions disclosed herein can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. Embodiments of the inventions can comprise several novel features. No single feature is solely responsible for its desirable attributes or is essential to practicing the inventions herein described.

Overview

Figure 1:
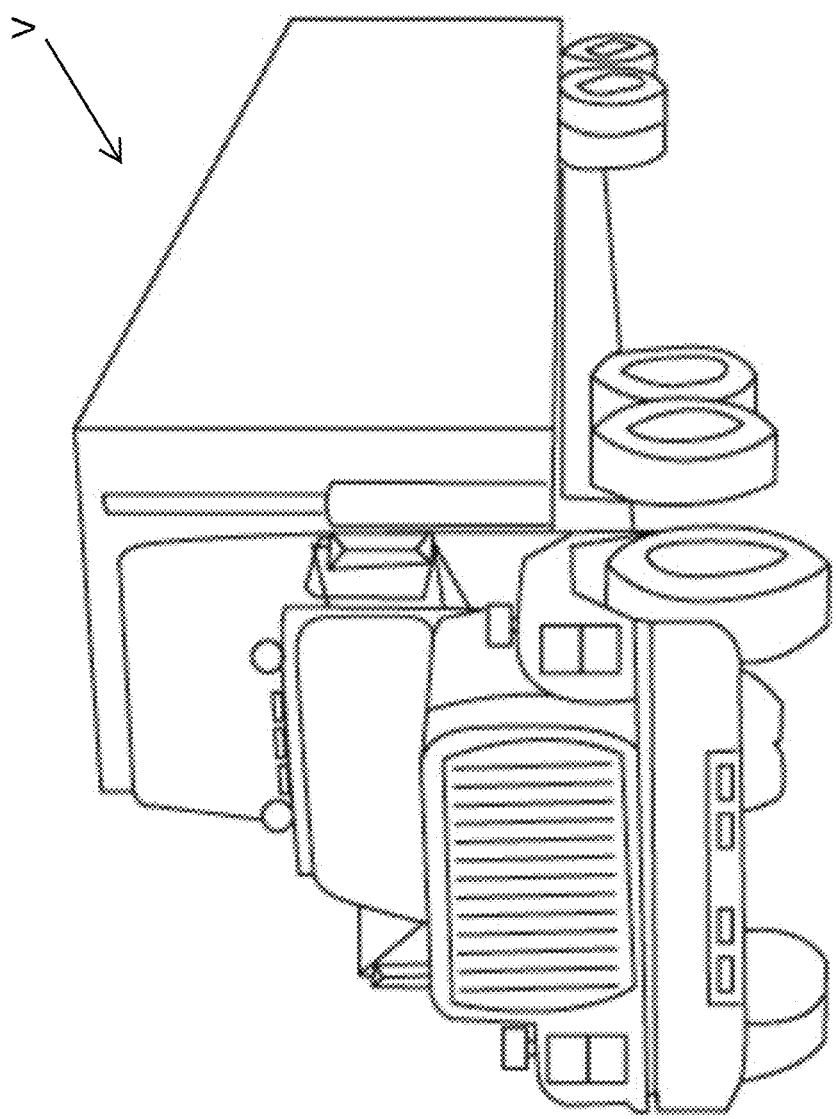
FIG. 1 illustrates a perspective view of a heavy vehicle.

FIG. 1 illustrates an example of a heavy vehicle V. A heavy vehicle can include, for example, an articulated vehicle, tractor-trailer (also called a tractor-trailer, semi, big rig, eighteen-wheeler, or otherwise), tank truck, box truck, flatbed truck, wrecker truck, garbage truck, cement truck, dump truck, grader, backhoe, front loader, mining truck, etc. In some implementations, a heavy vehicle (including a trailer, if any) has a maximum weight of at least 80,000 lbs. and/or an allowable length of at least 18 meters.

Figure 2:
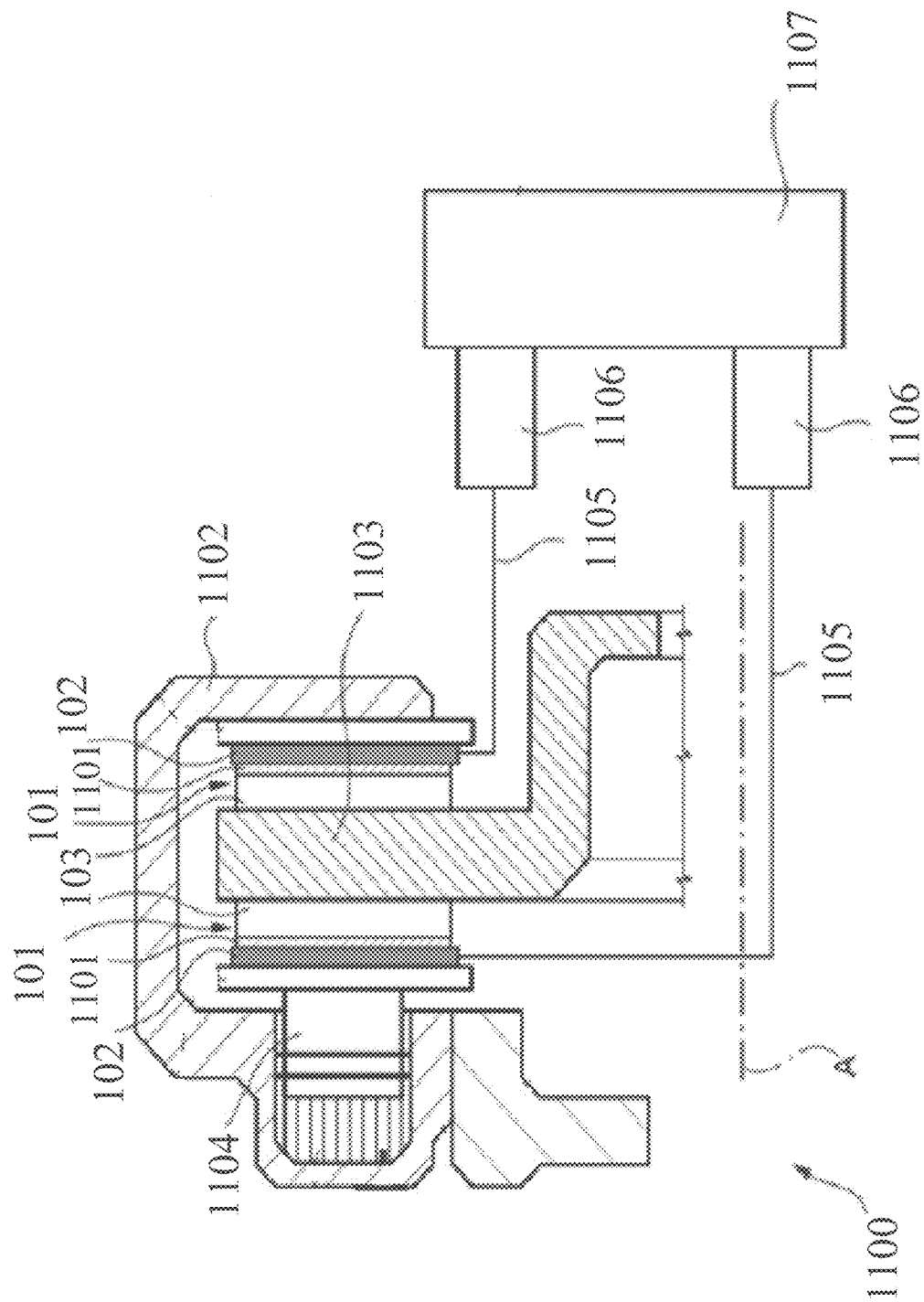
FIG. 2 illustrates a side view of a braking unit, such as a braking unit of the heavy vehicle of FIG. 1.

FIG. 2 shows a braking unit 1100 of a vehicle, such as the heavy truck shown in FIG. 1. The braking unit 1100 can include a caliper 1102 and a disk shaped rotor 1103 rotating about an axis of the wheel of the vehicle. The braking unit 1100 can include a braking device 101, such as a brake pad or brake shoe. Two opposite braking devices 101 are movable by a corresponding piston 1104 so that friction material 103 thereof may engage or disengage the opposite sides of the disk shaped rotor 1103. Signals coming from one or both braking devices 101 can be transmitted via cables 1105 to a processing unit 1107, which can include a signal conditioning device comprising analog front ends 1106 and digitalization. As will be discussed in more detail below, signals from the braking devices 101 can be used to aid in detecting and/or responding to a hot runner situation, which could occur if one or both of the braking devices 101 were in continuous and/or unintentional contact with the rotor 1103, and which could result in substantial detrimental heat generation.

Braking Devices with Sensors

Figure 3:
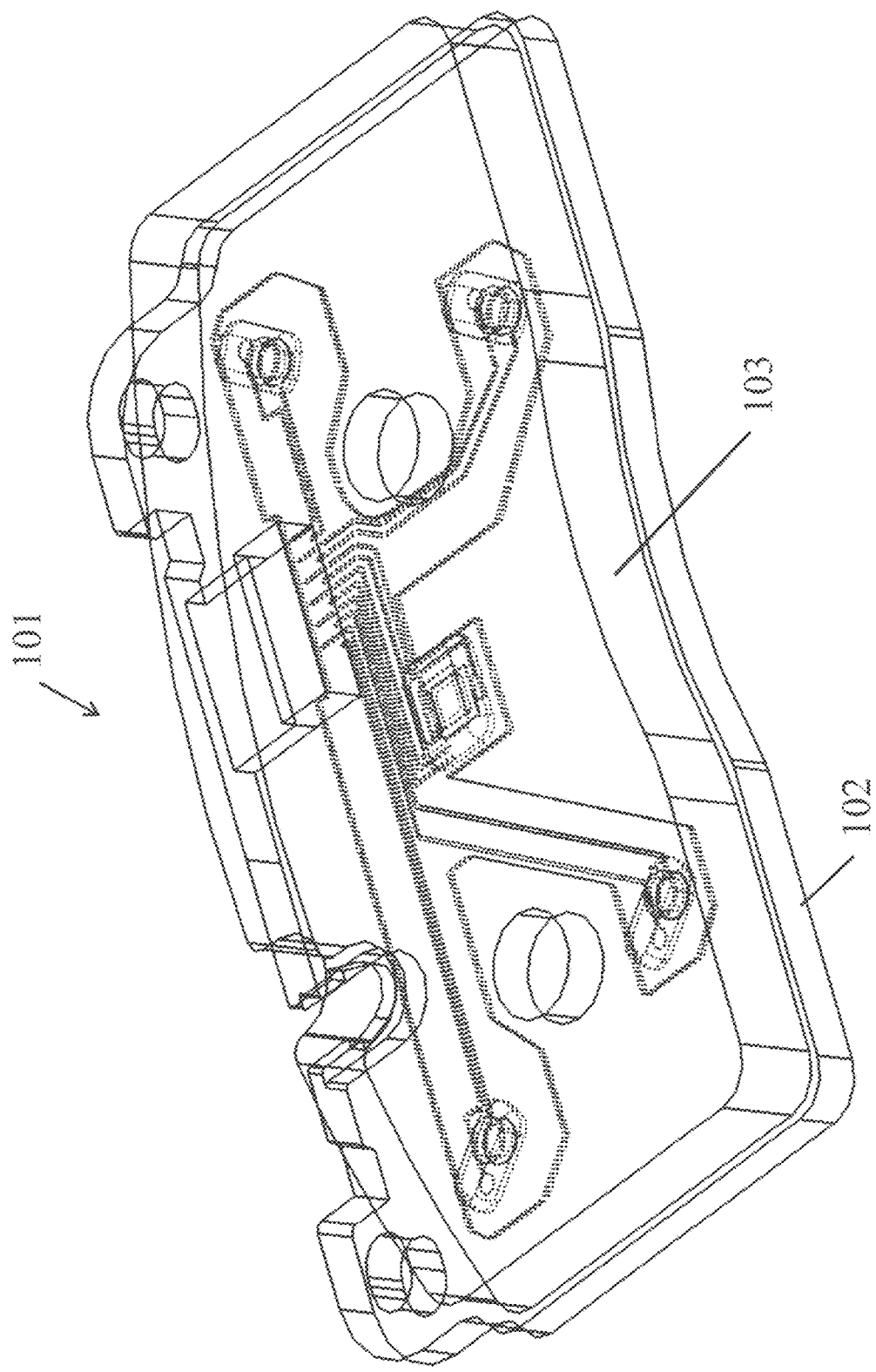
FIG. 3 schematically illustrates a perspective view of a braking device.
Figure 4:
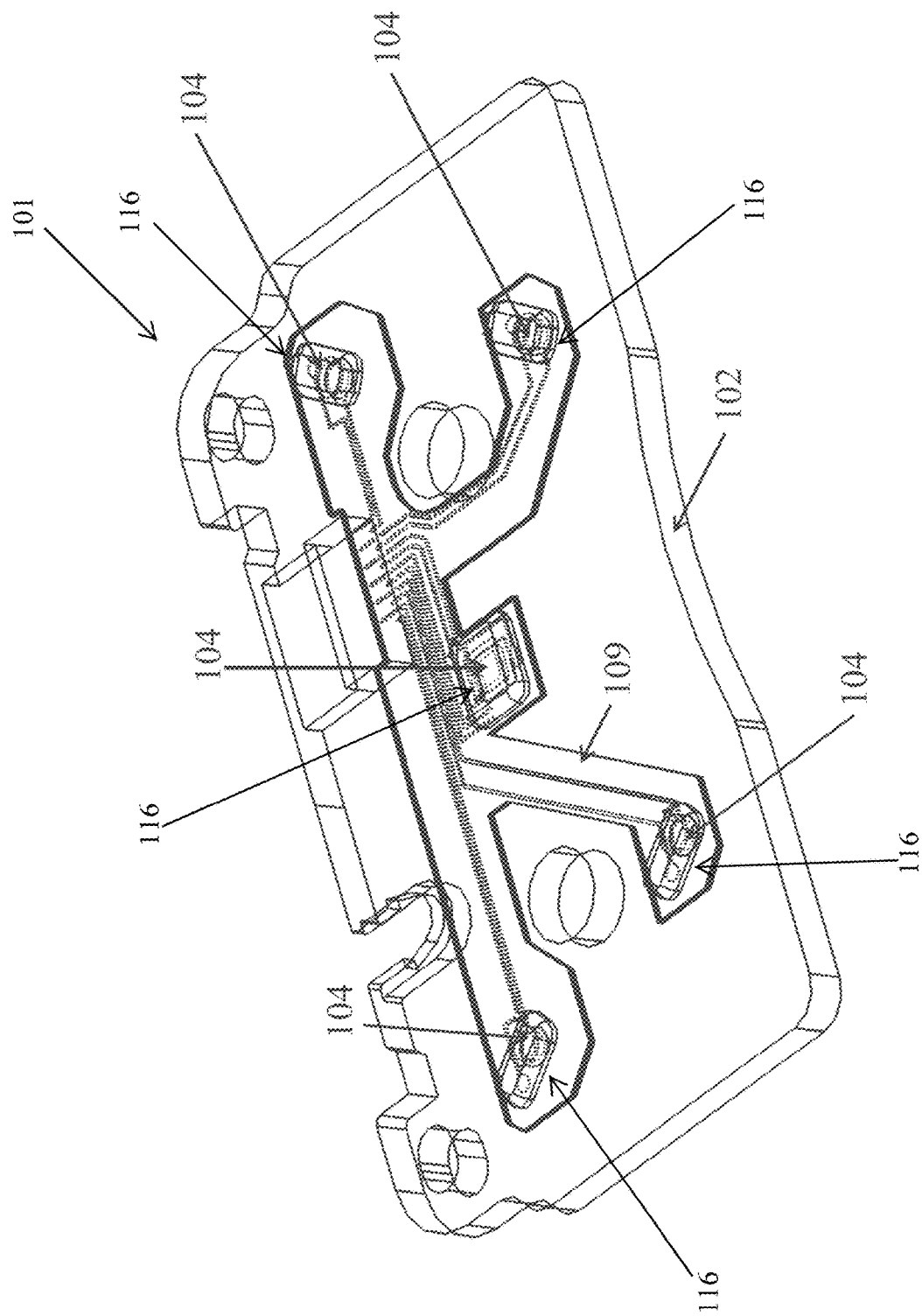
FIG. 4 illustrates a perspective view of the braking device of FIG. 3 without the block of friction material.

FIGS. 3 and 4 illustrate the braking device 101. For purposes of presentation, the braking device 101 shown in the figures, and discussed below, is described as a brake pad. However, the braking device 101 can take many other forms, such as a brake shoe or otherwise.

As shown, the brake pad 101 comprises a support element 102, which can be called a "backplate." The backplate is preferably but not necessarily metallic. The brake pad 101 can include a block of friction material 103 supported by the support element 102. The brake pad 101 can include one or more sensors 104, such as piezoceramic sensors. The sensors 104 can be supported by the support element 102. The sensors 104 can be interposed between the support element 102 and the block of friction material 103. As shown, the piezoceramic sensors 104 can be supported in a raised arrangement on the support element 102.

The support element 102 in particular is shaped as a contour shaped flat plate having a first main planar surface 105 that is intended in use to face an element to be braked, such as a vehicle brake disc, and a second main planar surface 106 that is parallel to the first main planar surface 105. The block of friction material 103 has, in particular, a first main planar surface 107 that is conjugated to the first planar surface 105 of the support element 102 and a second planar surface 108 that is parallel to the first planar surface 107, and intended in use to direct contact with the element to be braked.

The piezoceramic sensors 104 are able to detect the forces that are exchanged in use during the contact between the brake pad 101 and the element to be braked as a result of their inherent ability to emit an electrical signal when subjected to a mechanical stress. As shown, the support element 112 supports an electrically insulated electrical circuit 109. The circuit 109 has electrical contacts to which electrodes of the piezoceramic sensors 104 are connected. The electrical circuit 109 receives and transmits electrical signal, which is generated without the need for an electrical power supply from piezoceramic sensors 104, when they are subjected to a mechanical stress in the direction of polarization. The electrical signal emitted by the piezoceramic sensors 104 and collected by the electrical circuit 109 can either be processed in real time or at a later point in time.

The piezoceramic sensors 104 are made of piezoceramic materials with a Curie temperature greater than 200° C. and are formed of a preferably cylindrical body that is polarized in the direction of its axis and delimited by a pair of opposite flat faces that are arranged in use parallel to the main planar surfaces of the support element 102. Preferably only one of the faces, in particular, the one facing the electrical circuit 109, has both of the electrical signal sampling electrodes. Specific examples of piezoceramic sensors 104 that may be used are, for instance, PIC 255 (Manufacturer: PI Ceramic), PIC 300 (Manufacturer: PI Ceramic), PIC 181 (Manufacturer: PI Ceramic), PIC 050 (Manufacturer: PI Ceramic), TRS BT200 (Manufacturer: TRS Ceramics), PZT5A1 (Manufacturer: Morgan Advanced Ceramic), PZT5A3 (Manufacturer: Morgan Advanced Ceramic).

The electrical circuit 109 has branches that are suitably shaped in order to arrange the piezoceramic sensors 104 in discrete positions on the support element 102 and is also provided with an integrated electrical connector at the edge of the support element 102.

In some embodiments, one or more temperature sensors and/or one or more shear force sensors that are electrically connected to the electrical circuit 109 may be mounted on the support element 102. The electrically insulated electrical circuit 109 is preferably screen printed and applied directly onto the support element 102.

In certain implementations, some or all of the sensors on the support element 102 are installed onto the electrically insulated electrical circuit 109 from the side of the latter that faces the block of friction material 103. The sensors that are thus integrated into the support element 102 are highly capable of measuring the forces acting on the brake pad 101 during braking or in general during the running of the vehicle.

A damping layer 1101 (see FIG. 2) can be provided that is interposed between the block of friction material 103 and the support element 102. The damping layer 1101 can have a first main surface that is conjugated to the first planar surface of the support element 102 and a second surface that is conjugated to the first planar surface of the block of friction material 103. The damping layer 1101 can be mostly made of phenolic resin material.

In some configurations, each piezoceramic sensor 104 is embedded within a protective element 116. The protective element 116 can be located on the support element 102 at the position of the piezoceramic sensor 104. For the electrical insulation of the piezoceramic sensor 104 the protective element 116 can be made of electrically insulating material.

The protective element 116 can have mechanical properties, such as an elastic modulus that has been carefully chosen in order to limit the force transmitted to the piezoceramic sensor 104 when an external compression force is applied to the block of friction material 103. Further details regarding this and other aspects of the brake pad can be found in International Application No. PCT/IB2013/060881, filed Dec. 12, 2013 and U.S. patent application Ser. No. 15/184,806, filed Jun. 16, 2016, the entirety of each of which is hereby incorporated by reference herein.

The protective element 116 can be configured to direct at least part of the external compression force to an area of the support element 102 surrounding the piezoceramic sensor 104 itself. This can be beneficial because, for example, a considerable external compression force is in fact generated during the hot pressing of the block of friction material onto the support 102.

In various embodiments, the protective element 116 substantially or completely embeds the piezoceramic sensor 104. The protective element 116 can be made of a resin-based material, for example, the material for the protective element can include one or more of: polyimide resins, epoxy resins (loaded or not), Bismaleimide resins, and Cyanate-Ester resins. In certain implementations, the protective element can be made by dripping the material at a standard pressure and moderate temperatures (such as less than about 200° C.) prior to forming the block of friction material 103. Ceramic materials that are much harder than resins and suitable for temperatures above 350° C. may however also be used for the protective element.

In some embodiments, some or all of the sensors and/or other components of the electrical circuit 109 have a respective protective element, such as a protective element of the same type as that described above. In various embodiments, due to the protection provided by the protective element 116, the forces actually experienced by the sensors during the production of the brake pad 101 or when the brake unit is in operation is reduced.

Certain Hot Runner Detection and Response Systems

Figure 5:
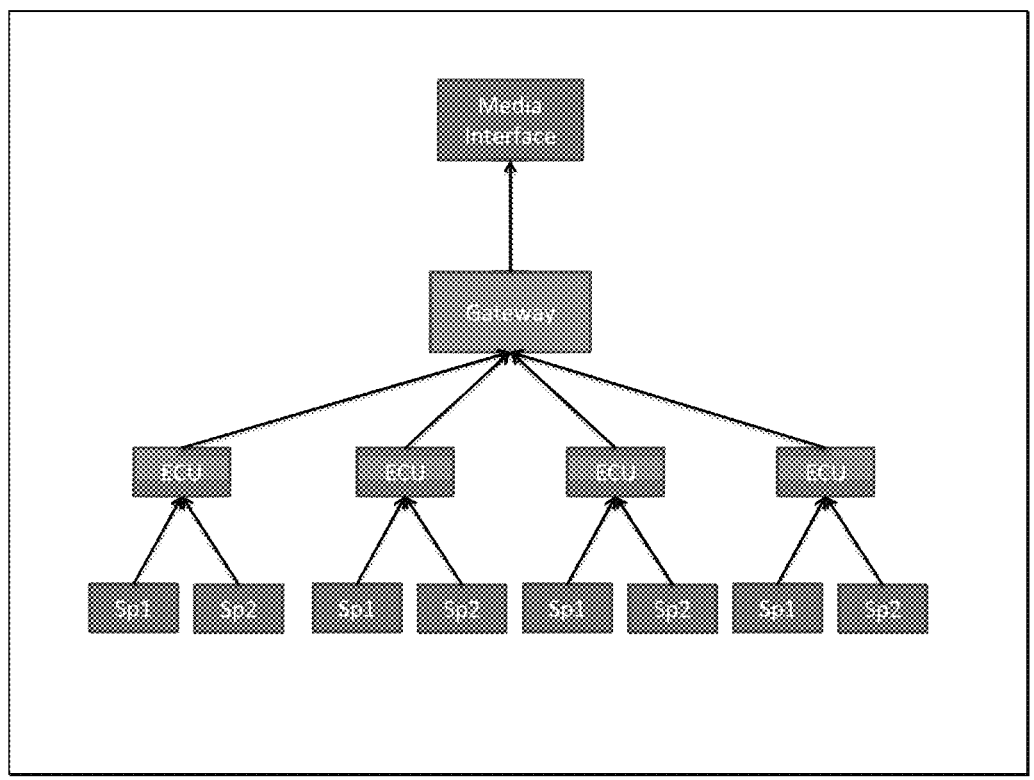
FIG. 5 schematically illustrates an embodiment of a hot runner detection and response system.

FIG. 5 schematically illustrates a system for detecting and/or responding to overheated braking components, such as may occur during a hot runner condition. As shown, the system can include sensors (Sp1 and Sp2), which can be integrated into respective brake pads. The system can include ECU (Electronic Control Units), which can acquire analog signals from the sensor and digitize and process the signals to detect hot runners. The system can include a sensor gateway, which can receive alarms and/or data from the ECUs. The system can include a media interface, which can receive alarms and/or data from the gateway. In some embodiments, the media interface can provide a human interface, such as delivering data and/or alarms for hot runners to a user (e.g., a driver) by visual and audio messages.

Figure 6:
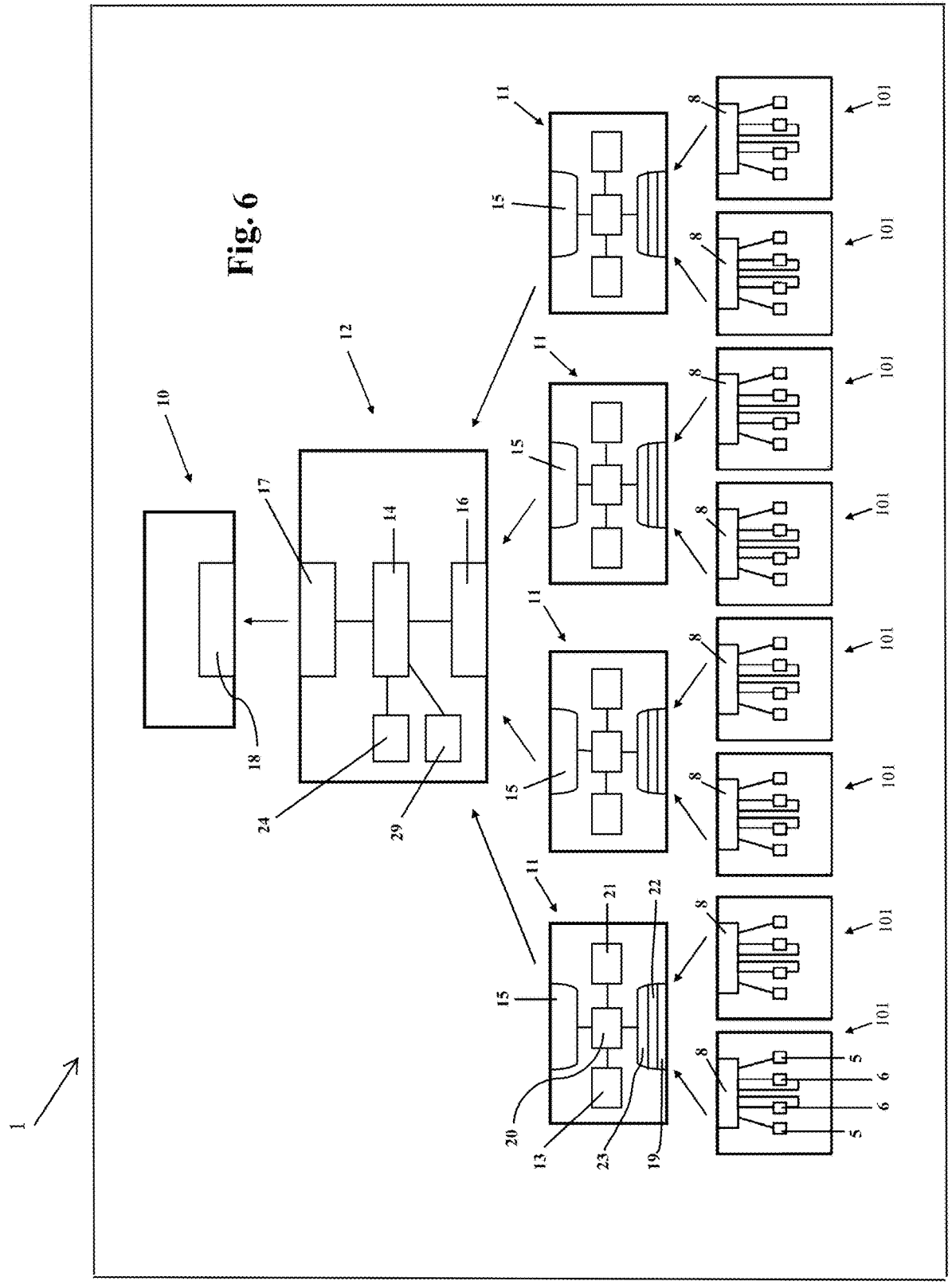
FIG. 6 schematically illustrates another embodiment of a hot runner detection and response system.

FIG. 6 schematically illustrates another system 1 for detecting and/or responding to overheated braking components, such as overheating that may occur during a hot runner condition. As will be described in more detail below, the system 1 can reduce or eliminate overheating in braking unit, such as braking units for heavy vehicles. As will be discussed in more detail below, in various embodiments, the system 1 can be configured to detect when a hot runner condition is present in at least one wheel of a vehicle, such as a heavy vehicle. In certain implementations, the system 1 can be configured to respond to a hot runner condition being detected, such as by sending an alert to a user, to an on-board or off-board computer system, or otherwise.

As illustrated, the system 1 can include one or more of the brake units 1100. As described above, the brake units 1100 can comprise a caliper with two brake pads 101 that can be activated onto a disk brake. In some variants, the brake units 1100 comprise brake shoes that can be activated against a drum brake.

Figure 7:
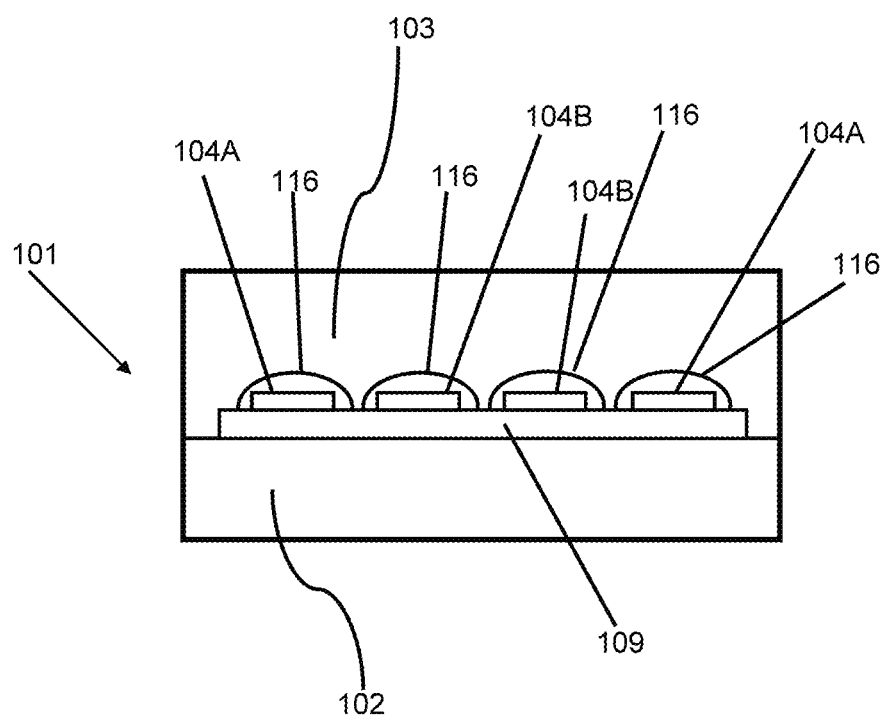
FIG. 7 illustrates a diagram of a brake pad of the system of FIG. 6.

FIG. 7 illustrates a schematic side view of the brake pad 101, which can be identical or similar to the brake pad 101 described above. As shown, the brake pad 101 can have a support 102 and a block of friction material 103 connected with the support 102 and configured to act upon the associated disk brake. The brake pad 101 components can be designed for use at high temperatures. For example, the components can be configured to operate at a temperature of at least about 600° C.

The brake pad 101 can include one or more sensors 104A, 104B interposed between the support 102 and the block of friction material 103. The sensors 104A, 104B can be mounted onto an electrically insulated electrical circuit 109 designed to acquire the electrical signals emitted by the sensors 104A, 104B to be processed either in real time or at a later time. The electrical circuit 108 can be integrated into the support 102, such as by heat resistant screen printing technology (e.g., glass ceramic material). The sensor 104A can comprise a temperature sensor, such as PT1000 sensors. In some embodiments, the brake pad 101 includes only one temperature sensor 104A. In certain variants, the brake pad 101 comprises a plurality of temperature sensors 104A. In some embodiments, the sensor 104B comprises an ancillary sensor, such as a pressure sensor (e.g., a piezoceramic pressure sensor) and/or a shear sensor (e.g., a piezoceramic shear sensor). Some embodiments comprise only one sensor 104B. Some variants include a plurality of the sensors 104B. The sensors 104A, 104B and the electrical circuit 109 can be covered by a protective element 116 (also called a protective layer). The protective layer can be made of electrically insulating material. In some embodiments, the protective layer comprises a ceramic material.

With regard to FIG. 6 again, the system 1 can include control units 11, 12. In some embodiments, the control unit 11 comprises a peripheral control unit and the control unit 12 comprises a central control unit. Various embodiments have one or more of the peripheral control units 11 and/or the central control unit 12. For example, the system 1 can include 1, 2, 3, 4, 5, 6, 7, 8, or more peripheral control units 11 and/or 1, 2, 3, 4, 5, 6, 7, 8, or more central control units 12. In some embodiments, the peripheral control units 11 can be located at or near a respective brake and/or at or near a respective wheel. For example, the system 1 can include at least one peripheral control unit 11 for each wheel. Some embodiments include at least one peripheral control unit 11 for each set of wheels on the end of an axle, such as one peripheral control unit 11 for each of the pairs of rear trailer wheels shown in FIG. 1. In certain embodiments, the central control unit 12 is located in a place that is centralized on the vehicle and/or in a place to facilitate service or connection with other components. For example, the central control unit 12 can be located in or near a vehicle on-board electronic system, such as an electronic control unit (ECU). The central control unit 12 does not need to be centrally located, such as in relation to the vehicle overall, the positioning of the peripheral control units 11, the sensors, the wheels, or otherwise.

The peripheral control units 11 can be configured to communicate (e.g., receive signals from) the sensors 104A, 104B of the brakes pads 101. For example, the peripheral control units 11 and sensors 104A, 104B can communicate by a communication interface 8 on the brake pad and a corresponding communication interface 19 on the brake pads 101. In some embodiments, the interface 8 comprises an electrical connector. In some variants, the interface 8 comprises a wireless connection (e.g., RF transmitter and receiver). The connector can be configured to electrically couple with the electrical circuit 109. The connector 109 can be configured to transmit electrical signals from the sensors 104A, 104B to one or more components on the outside of the brake pad 101 (e.g., the unit 11) for processing.

The peripheral control unit 11 can comprise a memory 13, a processor 20, and an electrical power supply 21. The peripheral control unit 11 can have an A/D digitization stage 22 that transforms the analog signals from the sensors 104A, 104B into digital signals. The peripheral control unit 11 can have a digital signal conditioning stage 23. The processor 20 of the peripheral control unit 11 can be programmable to process the incoming digital signals. In some embodiments, the peripheral control unit 11 is configured to generate an alarm or pre-alarm drive signal to be sent to the central control unit 12, as is discussed in more detail below. As illustrated, the peripheral control unit 11 can be connected with the central control unit 12, such as through communication interfaces 15, 16. The communication interfaces can comprise a wired connection (e.g., an electric cable) or a wireless connection (e.g., RF transmitter and receiver).

In certain embodiments, the central control unit 12 is configured to concentrate and/or convert the information received from peripheral control units 11 and/or to transmit information to the CAN-bus of the vehicle, such as, for communication with the ECU of the vehicle. The central control unit 12 can include a memory 24 and an electrical power supply 29. The memory 24 can be used to store information received from the peripheral control unit 11 or other information, such as program instructions, threshold values, etc. In some embodiments, the memory 24 contains at least one first threshold temperature. In some variants, the memory 13 of the peripheral control unit 11 contains the first threshold temperature.

As shown, the system 1 can include a comparator 14. In the illustrated embodiment, the comparator 14 is located in the central control unit 12, though in other embodiments the comparator 14 is located additionally or alternatively in one or more of the peripheral control units 11. The comparator 14 can be configured to determine and/or validate whether the temperature detected for at least one brake pad 101 exceeds the first threshold temperature. In some embodiments, the first threshold temperature is at least about: 300° C., 350° C., 400° C., 450° C., 500° C., 550° C., 600° C., temperatures between the aforementioned temperatures, or other temperatures. The comparator 14 can be configured to determine whether the temperature detected for at least one other of the brake pads 101, and preferably for a majority of the other brake pads 101, is below the first threshold temperature. The comparator 14 can be configured for the real-time or non-real-time comparison of the temperatures detected for the brake pads 101. In some embodiments, depending upon the outcome of the comparison, the comparator 14 performs the validation or otherwise of the emission of an alarm. In some embodiments, the comparator 14 performs the validation immediately; in other embodiments the comparator 14 performs the validation after a time delay.

In some embodiments, the memory 13 and/or the memory 24 comprises a second temperature threshold that is less than the first temperature threshold. In some embodiments, the second threshold temperature is at less than or equal to about: 200° C., 250° C., 300° C., 350° C., 400° C., 450° C., temperatures between the aforementioned temperatures, or other temperatures. The comparator 14 can be configured to determine whether the temperature detected for at least one of the brake pads 101 is between the first and second temperature thresholds. If so, some embodiments generate a pre-alarm drive signal.

The central control unit 12 can be programmable to receive and/or validate the alarm drive signal and/or the pre-alarm drive signal from one or more of the peripheral control units 11. In some implementations, the central control unit 12 is configured to automatically convert the alarm drive signal into an activation signal. The central control unit 12 can be configured to automatically translate the pre-alarm drive signal into a pre-alarm activation signal. The activation signal and/or the pre-alarm activation signal can be received by an alarm unit 10 of the system 1. The alarm unit 10 can be configured to communicate with the central control unit 12 via communication interfaces 17, 18. The communication interfaces 17, 18 can be cabled or wireless.

The alarm unit 10 can be part of a safety feature of the system 1. The safety feature can be configured to detect, inhibit, and/or prevent overheating of the brakes. In some embodiments, the safety feature includes the alarm unit 10 and one or more of the control units 11, 12, which communicate with the sensors 104A, 104B. In various embodiments, at least one of the components of the safety feature are configured to communicate with one or more systems of the vehicle, such as with the ECU of the vehicle via the CAN-bus or otherwise.

As previously mentioned, the peripheral control unit 11 can be programmable to generate an alarm or pre-alarm drive signal to be sent to the central control unit 12, and the central control unit 12 can be configured to convert the drive signal into an activation signal of the alarm unit and/or to translate the pre-alarm drive signal into an activation signal of an alarm unit 10. The central control unit 12, in the case of validation, can activate the alarm unit 10 in order to emit a first alarm signal. In some embodiments, the activation is performed immediately; in other embodiments the activation occurs after a time delay. The alarm unit 10 can be configured for the emission of a visual and/or audible alarm that can be perceived within the vehicle. For example, the alarm unit 10 may include lights (e.g., LEDs) and/or buzzers, such as on the instrument panel of the vehicle. Alternatively, or additionally, the alarm unit 10 can be configured to transmit an alarm to a user interface (e.g., such as to the driver or another user's smartphone and/or to an off-board computerized fleet management system). The system 1 can include or interface with wireless communication hardware or software to transmit the alarm. In this way, the operating malfunction of the braking unit is promptly noticed by the driver who can then take the necessary timely actions to reduce or eliminate the malfunction before the onset of catastrophic events. For example, the driver can slow or stop the vehicle to allow the temperature of the brake units 1100 to decrease and/or can arrange for maintenance of the malfunctioning brake unit 1100. In some implementations, in response to the alarm, an automatic reaction of the vehicle can occur, such as the vehicle stopping or its maximum speed being reduced. In some embodiments, the alarm is sent to the ECU of the vehicle, which can be programmed to automatically take an action in response.

This is of course just one example among the various possible configurations for the control units 11, 12. Another possible configuration has a single peripheral control unit 11 for handling the sensors 104A, 104B of all of the brakes. In another contemplated variation, the central control unit 12 integrates all of the functions including those of the peripheral control units 11. For example, the central control unit 12 can be connected with the brake pads 101 without a separate intervening peripheral control unit 11. Some embodiments include a plurality of peripheral control units 11, each located at a respective wheel of the vehicle. This can be beneficial since each peripheral control unit 11 can be located at or near its respective wheel. Some variants include a single peripheral control unit 11, which can be beneficial in consolidating components and functionality and/or by positioning the peripheral control unit 11 in a central location between the wheels. In some implementations, the vehicle CAN-bus can be connected to the peripheral control units 11 in addition to, or instead of, the central control unit 12. In any case, the connection to the CAN-bus can be achieved by radio links such as Bluetooth, Wi-Fi or other radio protocols and standards based upon RF technology.

In some implementations, the electrical power supplies 21, 29 are configured to harvest and/or absorb energy from the motion of the vehicle, such as in the form of vibrational, kinetic, and/or thermal energy that can be converted into electrical energy. The electric components of the system 1 (e.g., the controllers 11, 12) can be powered by the electrical energy converted from the energy absorbed from the motion of the vehicle. In some embodiments, the energy harvester comprises a piezoelectric crystal, thermoelectric generator, or otherwise. The electrical energy can be stored in a storage device, such as a battery or capacitor.

Certain Hot Runner Detection and Response Methods

Figure 8:
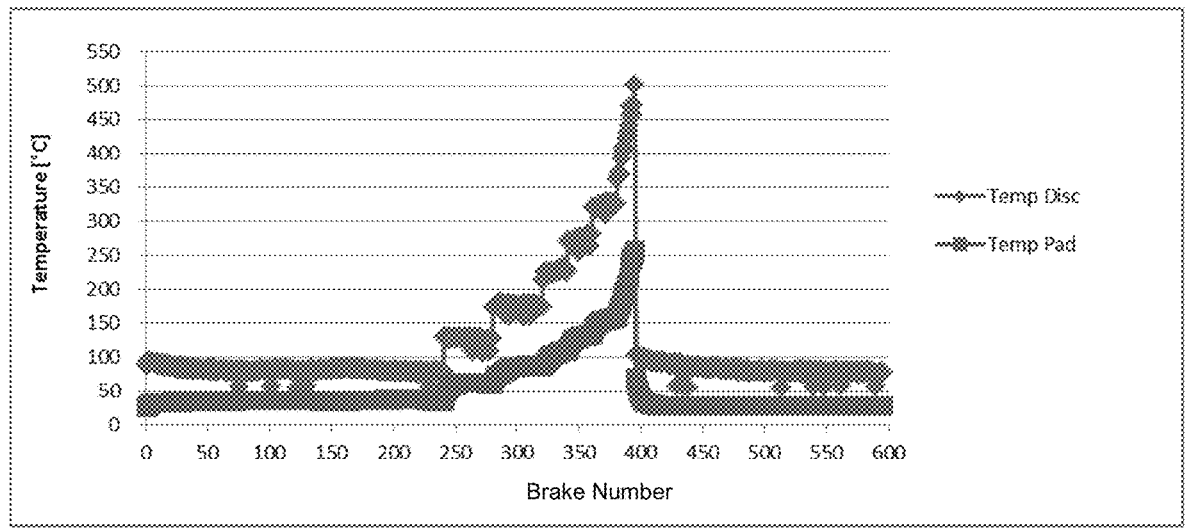
FIG. 8 illustrates a chart of the temperature of a disk brake and the temperature of a brake pad.

Various hot runner detection and response methods are described below. In some embodiments, the methods are based upon the sensors 104A, 104B mounted on the brake pads 101. Certain embodiments take advantage of the fact that there is typically a strong correlation between the temperature distribution over the disk brakes and the brake pad 101 where the temperature sensors 104A are installed. An example of such correlation is shown in FIG. 8, which plots the temperature of a disk brake and the temperature of a brake pad. It is known that the brake disk temperature (and therefore also that of the brake pad) can influence the appearance of hot runners and the relative increase in this value is a typical side effect of the hot runners phenomenon. In the event of a hot runner condition, the brake disk temperature and therefore the temperature of the brake pad 101 tends to rise in an abnormal manner and very quickly up to limiting values (even above 600° C.). Thus, it can be beneficial to monitor the temperature of the brake pad 101 and/or to detect a hot runner.

In some embodiments, to reduce or avoid false alarms, it is useful to adopt a more sophisticated strategy for discriminating a hot runner from a normal rise in temperature due, such as may occur during prolonged use of the braking unit, for example, when traveling through long mountainous sections of road, especially downhill, which involves very high braking unit temperatures without there being an actual malfunction of the braking unit itself. In some embodiments, the ancillary pressure sensors 104B or shear sensors are used, in conjunction with an analysis based upon the temporal flow of data, preferably in real time, and correlations between the temperature and pressure data or braking torque data. For example, a period of time T is appropriately set such that it is long enough for the phenomena identified by the analysis carried out within this period T not to be confused with those phenomena that are typical of normal braking that normally lasts much less than a minute. In some embodiments, the period T equal to a length of at least about: 5 minutes, 10 minutes, 15 minutes, time values between the aforementioned values, or other time values. The period T can be short enough to allow for the detection of hot runners sufficiently early to limit or nullify the damage associated with the hot runners.

In some implementations, the logic for the activation of an alarm signal is based upon the definition of two logic functions H(t) and G(t). These functions are as follows within the period T:

$H(t) = -1$ if $P < P_{threshold}$;

$H(t) = 1$ elsewhere;

$G(t) = -1$ if $T < T_{threshold1}$; and $G(t) = 1$ elsewhere.

In which:
P is the brake pressure as measured by the pressure sensors 104B (or by other sensors on board the vehicle); and
T is the temperature measured by the temperature sensors 104A.

In some embodiments, $P_{threshold}$ is about 10 bar and/or $T_{threshold1}$ is at least about 500° C. or at least about 600° C. In some implementations, the pressure P is the pressure measured at the caliper. In certain embodiments, the pressure P is the pressure measured at the brake pad 101. In certain variants, in place of the pressure P, the torque τ can also be used with identical or similar logic and an identical or similar threshold value.

Thanks to the calculation of the correlation between the two functions within the period T by the following integral I:

$$I = \frac{1}{T} \int_0^T G(t)H(t)dt$$

It is possible to obtain a condition that depends upon the correlation of the two functions G(t) and H(t). In fact, under normal working conditions (without the presence of hot runners) it is expected that the two functions will be highly correlated, which means in numerical terms that the integral of I=1 or very close to it. In the presence of a hot runner at a wheel the integral of I is consistently less than 1. In fact, in the absence of braking during the period T, I=-1. A condition can therefore be determined for the presence of hot runners by setting an appropriate threshold that is low enough for I, being identified as the threshold for generating an alarm activation signal for the presence of a hot runner.

In some embodiments, the threshold may be set as $I_{threshold} < 0$. When this condition is true over the period T, this would indicate the presence of a hot runner. This would mean having more than 50% of the period T resulting in no correlation between the brake pad temperature and pressure.

In certain implementations, to reduce or avoid the occurrence of false alarms, fuzzy logic may be applied to determine the intermediate degrees of probability of the presence of a "hot runner event". The logic can include a cross-check between the I values among the various brake pads. In some situations, if all or the majority of the pads are over $I_{threshold}$ then the presence of a hot runner is more likely.

In some embodiments, a method for detecting and/or responding to a hot runner includes determining whether, for at least one brake pad, whether $T > T_{threshold1}$. If so, the method can include generating a pre-alarm drive signal. The pre-alarm drive signal can be automatically converted into an activation signal for the alarm unit 10, which emits a pre-alarm. For example, a first type of warning (e.g., a chime and/or light) can be activated. In some embodiments, the method includes determining, for at least one brake pad, whether $T > T_{threshold1}$ and $I < 0$. If so, the method can include generating an alarm drive signal indicating the presence of a hot runner. In some embodiments, the method includes determining whether the alarm activation signal is not detected by any additional brake pads 101, such as by a majority of the brake pads 101. If so, then the alarm activation signal can be found to be validated. The alarm activation signal can be converted into an activation signal for the alarm unit 10, which can emit an alarm indicating the presence of a hot runner. For example, a second type of warning (e.g., a chime and/or light) can be activated.

In certain implementations, a method for detecting and/or responding to a hot runner includes the use of temperature data only. In some such embodiments, the correlation is examined between the temperatures of the brake pads 101 during the period T. The method can include determining whether a second temperature threshold (e.g., $T_{threshold2} < T_{threshold1}$) is established. In some embodiments, the method includes determining whether, for at least one brake pad 101, whether $T > T_{threshold2}$ and $< T_{threshold1}$. If so, then a pre-alarm drive signal can be generated. The pre-alarm drive signal can be automatically converted into an activation signal for the alarm unit 10, which emits a pre-alarm, such as activating a chime or light. In some embodiments, the method includes determining, for at least one brake pad 101, whether $T > T_{threshold1}$. If so, then an alarm activation signal can be generated indicating the presence of a hot runner. In some embodiments, the method includes determining whether the alarm activation signal has been detected for others of the brake pads, such as a majority of the brake pads 101. If so, then the alarm activation signal can be considered validated. The alarm activation signal and can be converted into an activation signal for the alarm unit 10, which emit an alarm indicating the presence of a hot runner, such as activating a chime or light.

Figure 9:
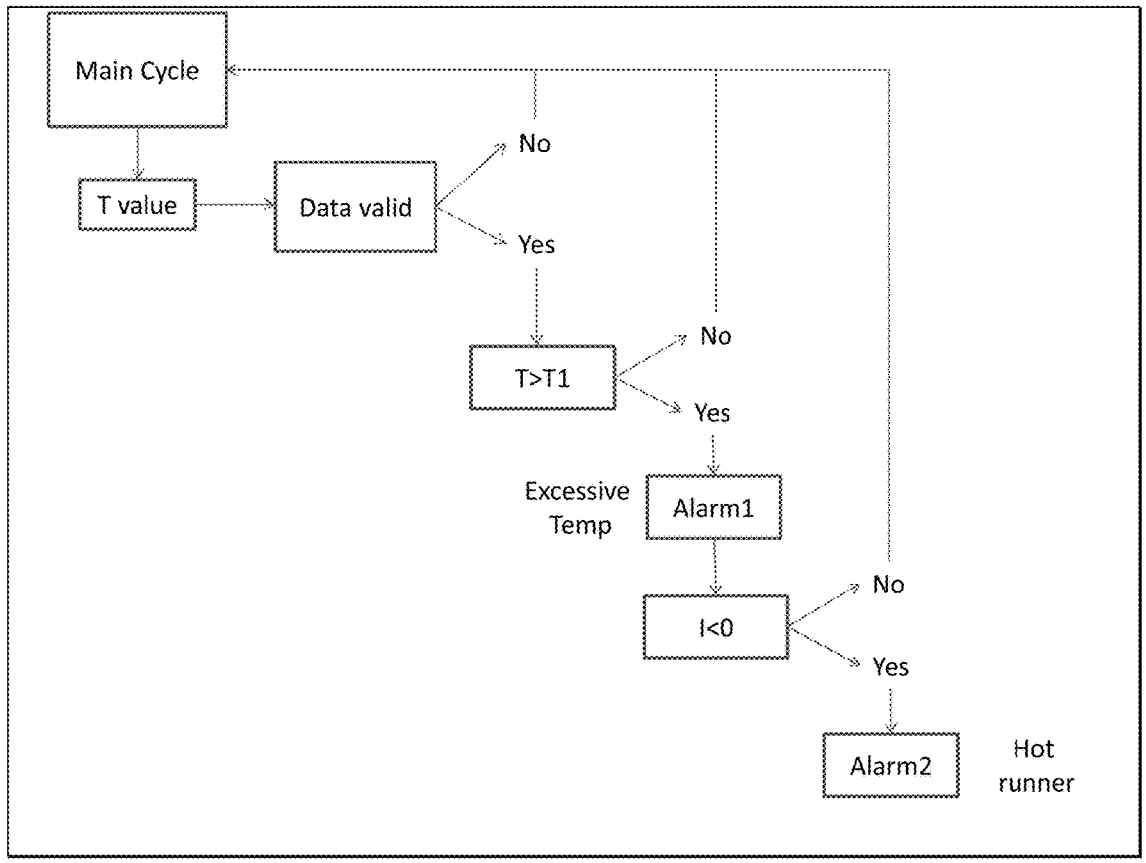
FIG. 9 schematically illustrates a method of detecting and responding to a hot runner.

FIG. 9 illustrates another method for detecting and/or responding to a hot runner. As shown, the method can begin at a main cycle. The method can include receiving a temperature value T. Some embodiments include determining whether the value T is valid, such as whether the temperature is within the expected ranges of possible temperatures. If no, then the method returns to the main cycle. If yes, then the method proceeds. The method can include determining whether the $T > T_{threshold1}$. If no, then the method returns to the main cycle. If yes, then the method proceeds. The method can include transmitting a first alarm to indicate that an excessive temperature has been detected. The method can include determining whether I<0. If no, then the method returns to the main cycle. If yes, then the method proceeds. The method can include transmitting a second alarm, which can indicate that a hot runner has been detected.

Some methods and systems are configured to detect and respond to a "cold runner." A cold runner can occur when one or a minority of the brake pads are at a lower temperature than the other brake pads. This could indicate that the brake pad with the lower temperature is not properly operating (e.g., is not properly engaging with the brake disk). Various embodiments can be configured to detect such a cold runner condition and to provide an alarm or other indication, such as to the driver, another user, to a fleet management system, etc. Certain embodiments have been described in which a hot runner determination involves comparing temperatures between wheels (e.g., compare the temperature of brake pad(s) at a first wheel with the temperature at some or all of the other wheels). Such a differential comparison between wheels can avoid false alarm conditions, such as could occur during prolonged breaking where the temperature of brake elements at multiple wheels would during normal operation (no hot runner present) be expected to raise to relatively high temperatures. However, in some other embodiments, a hot runner condition can be determined based on detecting that an absolute temperature at one or more wheels is higher than some threshold (e.g., higher than about 300° C., 350° C., 400° C., 450° C., 500° C., 550° C., or 600° C.). For instance, the system can detect a hot runner in one such implementation when the temperature of a braking device at a wheel exceeds a threshold value for longer than a certain period of time, such as beyond a period of time that would be expected during even prolonged braking operation (e.g., more than 10, 20, 30, 60, 90, or 120 seconds). In yet further embodiments, the system can detect a hot runner condition for a wheel based on detecting a temperature at a braking device of that wheel above a threshold value, in combination with using ancillary sensor data. For instance, the system could detect a hot runner condition where the temperature at a braking device of a given wheel is above a threshold and where one or more pressure or shear sensors of the braking device indicate that a braking pressure or torque at that braking device is higher by a threshold amount than a braking pressure or torque at a braking device of one or more other wheels.

Certain Terminology

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a device configured to carry out recitations A, B, and C" can include a first device configured to carry out recitation A working in conjunction with a second device configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

SUMMARY

Various hot runner detection and response systems, devices, and methods have been disclosed in the context of certain embodiments and examples above. However, this disclosure extends beyond the specifically disclosed embodiments to other alternative embodiments and/or uses and obvious modifications and equivalents thereof. In particular, while the systems, devices, and methods has been described in the context of illustrative embodiments, certain advantages, features, and aspects of the devices, systems, and methods may be realized in a variety of other applications. Various features and aspects of the disclosed embodiments can be combined with or substituted for one another in order to form varying modes of the devices, systems, and methods. The scope of this disclosure should not be limited by the particular disclosed embodiments described herein.

The hot runner detection and response systems, devices, and methods described above are susceptible to numerous modifications and variations, all falling within the scope of the inventive concept; moreover all of the components can be replaced by technically equivalent elements. Additionally, various aspects and features of the embodiments described can be practiced separately, combined together, or substituted for one another. A variety of combination and subcombinations of the disclosed features and aspects can be made and still fall within the scope of this disclosure. Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale should not be limiting, since dimensions and proportions other than what are shown are contemplated and are within the scope of this disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of hot runner detection and response systems, devices, and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular embodiments described above, but should be determined only by a fair reading of the claims that follow.

The following is claimed:

1. A vehicle braking apparatus comprising:
   a plurality of braking devices, each braking device comprising:
      a support;
      a friction material connected to the support and configured to interface with a brake disk or brake drum associated a wheel of a vehicle;
      a temperature sensor configured to output a temperature signal indicative of a temperature of the respective braking device; and
      an ancillary sensor positioned to measure one or more of pressure or torque associated with operation of the respective braking device;
   an alarm unit; and
   a controller unit that is in communication with the alarm unit and is configured to:
      receive the temperature signal from each temperature sensor;
      determine, using the temperature signal, a temperature of each braking device;
      compare a first temperature threshold with the temperature of each braking device; and
      activate the alarm unit to indicate a hot runner condition at least partly in response to determining that:
         a temperature of at least one of the plurality of braking devices is greater than or equal to the first temperature threshold;
         a temperature of at least one other of the plurality of braking devices is less than the first temperature threshold, and
         within a predetermined period, a predetermined correlation exists between the temperature signal produced by the temperature sensor of the at least one of the plurality of braking devices and a measurement signal output by the ancillary sensor of the at least one of the plurality of braking devices, wherein existence of the predetermined correlation within the predetermined period indicates an absence of a false hot runner alarm.

2. The vehicle braking apparatus of claim 1, wherein:
   the controller unit is further configured to:
      store a second temperature threshold that is less than the first temperature threshold;
      compare the second temperature threshold with the temperature of each braking device; and
      activate the alarm unit indicating an elevated temperature condition in response to determining that:
         the temperature of the at least one of the plurality of braking devices is greater than the second temperature threshold and less than the first temperature threshold.

3. The vehicle braking apparatus of claim 1, wherein the alarm unit emits an audible or visual alarm in a passenger compartment of the vehicle.

4. The vehicle braking apparatus of claim 1, wherein the controller unit is configured to activate the alarm unit based on a majority of the plurality of braking devices being determined to have a temperature that is less than the first temperature threshold.

5. The vehicle braking apparatus of claim 1, further comprising an energy harvesting device configured to convert energy from a motion of the vehicle into electrical energy.

6. The vehicle braking apparatus of claim 1, wherein the controller unit determines that an overheating condition exists at least in part by determining that the temperature of the at least one braking device is higher than the temperature of the at least one other braking device by an amount sufficient to indicate the overheating condition.

7. The vehicle braking apparatus of claim 1, wherein the controller unit determines that an overheating condition exists at least in part by determining that the temperature of the at least one braking device is at least about 450° C.

8. The vehicle braking apparatus of claim 1, wherein the controller unit comprises a plurality of controller units.

9. The vehicle braking apparatus of claim 8, wherein the plurality of controller units comprises a central control unit and at least one peripheral control unit configured to communicate with the central control unit.

10. The vehicle braking apparatus of claim 9, wherein the at least one peripheral control unit comprises a plurality of peripheral control units, and each of the plurality of the peripheral control units are configured to receive a temperature signal from a respective one of the plurality of braking devices.

11. The vehicle braking apparatus of claim 1, wherein the controller unit is further configured to compare the first temperature threshold with the temperature of each braking device in a period in which a driver of the vehicle is not braking.

12. The vehicle braking apparatus of claim 1, wherein the predetermined correlation corresponds to a correlation between a function dependent on the temperature signal and a function dependent on the measurement signal being less than a threshold amount.

13. A method of detecting overheating of brakes on a vehicle comprising a plurality of wheels and a plurality of associated braking units, wherein the braking units each comprise a brake pad or a brake shoe having a support, a friction material that is connected with the support and is configured to act on a brake disk or brake drum associated with the wheel, an ancillary sensor configured to measure one or more of pressure or torque associated with operation of the respective braking unit, and a temperature sensor, the method comprising:
    detecting, with the respective temperature sensors, a temperature of each of the braking units;
    accessing a first temperature threshold;
    comparing, with an electronic control unit, the temperature of each of the braking units with the first temperature threshold; and
    determining, with the electronic control unit, whether an overheating condition exists, wherein determining whether the overheating condition exists is at least partly based on:
        the temperature detected for at least one of the braking units is greater than or equal to the first temperature threshold;
        the temperature detected for at least one other of the braking units is less than the first temperature threshold; and
        within a predetermined period, a predetermined correlation exists between the temperature detected by the temperature sensor of the at least one of the of braking units and the pressure or torque detected by the ancillary sensor of the at least one of the braking units, wherein existence of the predetermined correlation within the predetermined period indicates an absence of a false overheating condition alarm.

14. The method of claim 13, wherein determining whether the overheating condition exists further comprises determining whether the temperature detected for the at least one brake pad or brake shoe is within a predetermined range of temperatures.

15. The method of claim 13, wherein determining whether the overheating condition exists further comprises determining whether the temperature detected for the at least one brake pad or brake shoe is greater than the first temperature threshold for a predetermined period of time.

16. The method of claim 15, wherein the method further comprises:
    acquiring a pressure of the at least one of the braking units, from the ancillary sensor of the at least one of the braking units, in response to the temperature of the at least one of the braking units being greater than the first temperature threshold; and
    accessing a pressure threshold, wherein determining whether the predetermined correlation exists further comprises determining, with the electronic control unit, whether the pressure is less than the pressure threshold.

17. The method of claim 13, wherein the method further comprises:
    determining, with the electronic control unit, whether an elevated temperature condition exists, wherein the elevated temperature condition exists based on the temperature of at least one braking device being greater than a second temperature threshold and less than the first temperature threshold; and
    activating an alarm in response to determining that the elevated temperature condition exists.

18. The method of claim 13, wherein the predetermined correlation corresponds to a correlation between a function dependent on the detected temperature and a function dependent on the detected pressure or torque being less than a threshold amount.

19. A braking apparatus for a vehicle comprising:
    a plurality of braking devices installed on the vehicle, each braking device comprising:
        a support;
        a friction material connected to the support and configured to interface with a brake disk or brake drum associated a wheel of a vehicle;
        a temperature sensor configured to output a temperature signal indicative of a temperature of the respective braking device; and
        an ancillary sensor positioned to measure one or more of pressure or torque associated with operation of the respective braking device; and
    a controller unit in communication with the plurality of braking devices, the controller unit configured to:
        receive the temperature signal from each temperature sensor;
        determine, using the temperature signal, a temperature of each braking device;
        determine whether a temperature of at least one of the plurality of braking devices is greater than a first temperature threshold;
        determine whether a temperature of at least one other of the plurality of braking devices is less than the first temperature threshold; and
        output an alarm signal indicating that an overheating condition exists in response to determining that:
            a temperature of at least one braking device is greater than the first temperature threshold;
            a temperature of at least one other braking device is less than the first temperature threshold and within a predetermined period, a predetermined correlation exists between the temperature detected by the temperature sensor of the at least one braking device and the pressure or torque detected by the ancillary sensor of the at least one braking device, wherein existence of the predetermined correlation within the predetermined period indicates an absence of a false overheating condition alarm.

20. The braking apparatus of claim 19, further comprising an alarm unit in communication with the controller unit, the alarm unit configured to activate an alarm in response to receiving the alarm signal.

21. The braking apparatus of claim 19, wherein the controller unit is further configured to:
  store a second temperature threshold;
  determine whether an elevated temperature condition exists, wherein the elevated temperature condition exists based on the temperature of at least one braking device being greater than the second temperature threshold and less than the first temperature threshold; and
  output an alarm signal in response to determining that the elevated temperature condition exists.

* * * * *